(12) United States Patent
Weinfurtner et al.

(10) Patent No.: US 12,155,636 B2
(45) Date of Patent: Nov. 26, 2024

(54) METHOD FOR CONTROLLING AN ENERGY GRID

(71) Applicant: Robert Bosch GmbH, Stuttgart (DE)

(72) Inventors: Jared Weinfurtner, Weilheim An Der Teck (DE); Christian Heise, Aachen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 302 days.

(21) Appl. No.: 17/719,531

(22) Filed: Apr. 13, 2022

(65) Prior Publication Data

US 2022/0337563 A1 Oct. 20, 2022

(30) Foreign Application Priority Data

Apr. 19, 2021 (DE) ...................... 10 2021 109 752.5

(51) Int. Cl.
*H04L 9/40* (2022.01)
*G06F 21/60* (2013.01)
(Continued)

(52) U.S. Cl.
CPC .... *H04L 63/0428* (2013.01); *H02J 13/00028* (2020.01); *H04L 9/008* (2013.01)

(58) Field of Classification Search
CPC .................. H04L 63/0428; H04L 9/008; H02J 13/00028; H02J 13/00006; Y04S 40/20; G06F 21/602; G06Q 50/06
See application file for complete search history.

(56) References Cited

U.S. PATENT DOCUMENTS

2012/0311317 A1\* 12/2012 Elrod ...................... H04L 9/088
713/150
2013/0170640 A1 7/2013 Gentry
(Continued)

FOREIGN PATENT DOCUMENTS

DE 102007030492 A1 1/2009

OTHER PUBLICATIONS

Applications of Homomorphic Encryption, by Archer et al.; published 2017 (Year: 2017).\*
(Continued)

*Primary Examiner* — Vu V Tran
(74) *Attorney, Agent, or Firm* — NORTON ROSE FULBRIGHT US LLP; Gerard A. Messina

(57) ABSTRACT

A method for controlling an energy grid. In this method, first pieces of information about the past behavior of at least one user at the energy grid are ascertained by a processing unit assigned to the user, homomorphically encrypted and transferred homomorphically encrypted to a first data memory. An external processing unit reads the homomorphically encrypted first pieces of information, calculates as a function thereof second, homomorphically encrypted pieces of information about a predicted, future behavior of the user and stores the second, homomorphically encrypted pieces of information on a second data memory. The second, homomorphically encrypted pieces of information are read out from the second data memory and decrypted by the processing unit assigned to the user. A control of the energy grid takes place as a function of the decrypted second pieces of information.

9 Claims, 1 Drawing Sheet

(51) Int. Cl.
 *G06Q 50/06* (2024.01)
 *H02J 13/00* (2006.01)
 *H04L 9/00* (2022.01)

(56) References Cited

U.S. PATENT DOCUMENTS

2014/0298042 A1* 10/2014 Ogura ................. G06F 21/6209
 713/193
2015/0358153 A1* 12/2015 Gentry ................. H04L 9/3093
 380/30

OTHER PUBLICATIONS

Privacy Preservation of Data-Driven Models in Smart Grids Using Homomorphic Encryption by Syed et al.; published 2020 (Year: 2020).*

* cited by examiner

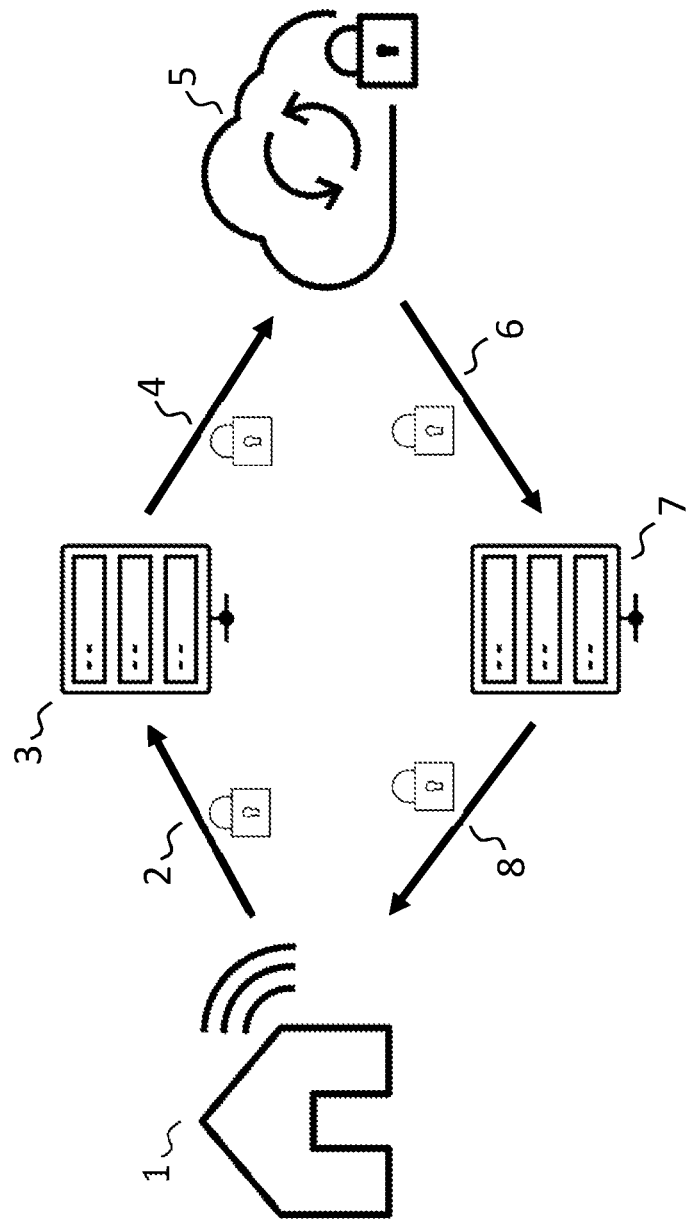

METHOD FOR CONTROLLING AN ENERGY GRID

CROSS REFERENCE

The present application claims the benefit under 35 U.S.C. § 119 of German Patent Application No. DE 10 2021 109 752.5 filed on Apr. 19, 2021, which is expressly incorporated herein by reference in its entirety.

FIELD

The present invention relates to a method for controlling an energy grid.

BACKGROUND INFORMATION

Energy service providers (Energy service companies—ESCo) or energy management systems (EMS) require for particular tasks a prediction of the electric load on an electric grid or for a particular consumer (household, generator, battery, etc.). Since corresponding predictions may be a function of many variables, the calculation of corresponding prediction models may be very complex and computationally intensive.

A predictive control method for an energy grid is described in German Patent Application No. DE 10 2007 030 492 A1.

A homomorphic encryption makes it possible to carry out calculations, in particular, mathematical operations on pieces of encrypted information, which correspond to the corresponding operations or calculations on the non-encrypted pieces of information.

U.S. Patent Application Publication No. US 2013/0170640 A1 describes a homomorphic encryption.

SUMMARY

In accordance with the present invention, a method is provided for controlling an energy grid. In accordance with an example embodiment of the present invention, in the method, first pieces of information about the past behavior of at least one user at the energy grid are ascertained by a processing unit assigned to the user, homomorphically encrypted and transferred homomorphically encrypted to a first data memory. An external processing unit reads the homomorphically encrypted first pieces of information, calculates as a function thereof second, homomorphically encrypted pieces of information about a predicted, future behavior of the user and stores the second, homomorphically encrypted pieces of information on a second data memory. The second, homomorphically encrypted pieces of information are read from the second data memory and decrypted by the processing unit assigned to the user. A control of the energy grid takes place as a function of the decrypted second pieces of information.

In this case, the control of the energy grid may include, in particular, a provision of energy to the at least one user and/or a tapping of energy from the at least one user. Accordingly, the user may be a consumer of energy and/or a producer of energy.

The past behavior of the user may include, in particular, pieces of information about an energy consumption or an energy contribution in the energy grid, in this case, for example, an amount or a temporal profile of the energy consumption or of the energy contribution may be included.

In one particularly preferred embodiment of the present invention, a user of the energy grid is located in a building and the external processing unit is located outside the building, in particular, in the form of a cloud-based computing resource or of a cloud computer. The first and the second data memories may, in particular, be decentralized data memories, in this case, it may also involve the same data memory. By utilizing a decentralized storing of the data, it is also possible to prevent a link from existing or being established between the encrypted data and the corresponding user.

The processing unit assigned to the user is able to transfer the homomorphically encrypted, first pieces of information, in particular, via a telemetry unit to the first data memory.

In preferred variants of the method of the present invention, the processing unit assigned to the user is able to transfer the encrypted, second pieces of information or parts of the encrypted, second pieces of information or a predicted, future behavior of the user derived from the encrypted, second pieces of information to a unit for controlling the energy grid, via which the control of the energy grid takes place.

The provided methods enable a calculation of prediction models by an external system on the basis of customer-specific or device-specific or user-specific data, without the external system needing access to the raw data in plain text. This is possible, since the prediction calculations may take place on encrypted data without the latter having to be decrypted for the calculation or processing by the external system.

Telemetric data about the behavior and energy consumption of users of an energy grid, which are assigned to a particular customer, are completely encrypted when they leave the customer's sphere of influence. The decentralized storing may also result in a corresponding connection being able to be established only with great difficulty for external users of the encrypted data. Computationally-intensive energy predictions are thus able to safely take place externally.

BRIEF DESCRIPTION OF THE DRAWINGS

Specific embodiments of the present invention are described below with reference to the FIGURE.

FIG. 1 schematically shows an exemplary distributed communication between units for implementing a control of an energy grid.

DETAILED DESCRIPTION OF EXAMPLE EMBODIMENTS

In order to efficiently carry out complex and computationally-intensive model calculations for predicting the energy requirement or energy provision of a user at an energy grid, these calculations may be outsourced to external computing resources, for example, to cloud-based services.

The provider of such a calculation service may, however, obtain detailed insights into the energy behavior of a particular customer if the corresponding data are transferred as unencrypted raw data or are retrievable via a direct link. In order to specifically adapt models to their customers, corresponding data may be stored in databases and specific behavior may be very specifically predicted. The plain text data and the pieces of information ascertainable therefrom about the corresponding user at an energy grid may represent for users of such a service a threat to their private sphere and may be undesirable for reasons of data protection.

FIG. 1 schematically shows an exemplary distributed communication between units for implementing a control of an energy grid.

For one or multiple users of an energy grid, which are assigned to a household 1, to a building 1, to a building section 1 or to another unit 1, which belongs, for example, to a particular customer of the energy grid, telemetric data about a behavior of the user or of the users are collected. The individual users in this case may be consumers, for example, household appliances, heating systems, charging stations, etc., as well as energy suppliers such as heat pumps, generators, etc. The collected pieces of information about the behavior may include, for example, an amount of energy consumption or energy contribution in a particular time window or a temporal profile of energy consumption or energy contribution, as well as pieces of information about the nature of the energy consumption or of the energy contribution. They may also include further pieces of information required for calculating a prediction model relating to the future behavior of the user or of the users.

The collected data are encrypted by a processing unit assigned to the user or to the users using a homomorphic encryption algorithm and thus encrypted are transferred 2. The encrypted data are stored on a decentralized data memory 3, for example, according to the IPFS protocol (Interplanetary File System, a blockchain-based protocol for storing data).

An external computer resource 5 of a prediction service reads data 4 from decentralized data memory 3 and calculates the prediction model on the encrypted data. In addition to the pieces of information about the user, it is also possible to use pieces of information of further users in this calculation. Due to the homomorphic encryption, a calculation is possible without the service requiring access to the decrypted telemetry data. The utilization of a decentralized storing of the data may also result in a linkage between the encrypted data and the corresponding user being able to be established only with great difficulty.

External computer resource 5 stores the encrypted result data 6 on a decentralized data memory 7. The user or a processing unit assigned to it monitors decentralized data memory 7 for updates and reads out the encrypted result data from 8. The user may decrypt the result data and utilize or forward these for the control of the energy grid.

During the entire sequence of the method, the collected data or the pieces of information about the behavior of the users of the energy grid are present externally only in encrypted form.

What is claimed is:

1. A method for controlling an energy grid, the method comprising the following steps:

ascertaining first pieces of information about a past behavior of at least one user at the energy grid, a processing unit assigned to the user;

homomorphically encrypting the first pieces of information, and transferring the homomorphically encrypted first pieces of information to a first data memory;

reading, by an external processing unit, the homomorphically encrypted first pieces of information, the external processing unit calculating, as a function of the read homomorphically encrypted first pieces of information, homomorphically encrypted second pieces of information about a predicted, future behavior of the user and storing the homomorphically encrypted second pieces of information on a second data memory;

reading out, by the processing unit assigned to the user, the homomorphically encrypted second pieces of information from the second data memory, and decrypting, by the processing unit assigned to the user, the read out homomorphically encrypted second pieces of information; and controlling the energy grid as a function of the decrypted second pieces of information.

2. The method as recited in claim 1, wherein the controlling of the energy grid includes providing energy to the user and/or tapping of energy from the user.

3. The method as recited in claim 1, wherein the past behavior of the user includes an energy consumption and/or an energy contribution in the energy grid, including an amount and/or a temporal profile of the energy consumption and/or of the energy contribution.

4. The method as recited in claim 1, wherein the user includes a consumer and/or a producer of energy in the energy grid.

5. The method as recited in claim 1, wherein the user of the energy grid is located in a building or in a building section and the external processing unit is not located in the building or in the building section.

6. The method as recited in claim 1, wherein the external processing unit is a cloud computer.

7. The method as recited in claim 1, wherein the first data memory and the second data memory are decentralized data memories.

8. The method as recited in claim 1, wherein the processing unit assigned to the user transfers the homomorphically encrypted first pieces of information via a telemetry unit to the first data memory.

9. The method as recited in claim 1, wherein the processing unit assigned to the user transfers the homomorphically encrypted second pieces of information or parts of the homomorphically encrypted second pieces of information or a predicted future behavior of the user derived from the homomorphically encrypted second pieces of information, to a unit for controlling the energy grid, via which the controlling of the energy grid takes place.

\* \* \* \* \*